Sept. 13, 1955 L. W. ALVAREZ 2,717,960
CODED PULSE GENERATING CIRCUIT
Filed Sept. 26, 1951 4 Sheets-Sheet 1

INVENTOR
LUIS W. ALVAREZ
BY D. E. Snyder
ATTORNEY

INVENTOR
LUIS W. ALVAREZ

INVENTOR
LUIS W. ALVAREZ

Sept. 13, 1955     L. W. ALVAREZ     2,717,960
CODED PULSE GENERATING CIRCUIT

Filed Sept. 26, 1951                       4 Sheets-Sheet 4

INVENTOR
LUIS W. ALVAREZ

BY
*D. C. Snyder*
ATTORNEY

United States Patent Office 2,717,960
Patented Sept. 13, 1955

2,717,960

CODED PULSE GENERATING CIRCUIT

Luis W. Alvarez, Berkeley, Calif., assignor, by mesne assignments, to the United States of America as represented by the Secretary of the Navy Application September 26, 1951, Serial No. 248,347

7 Claims. (Cl. 250—36)

This invention relates to radio beacons and especially to such as are normally inoperative but may be fired from remote points by radio signals.

One of the objects of the invention is to provide a beacon which will fire only when it receives a signal of a predetermined character and then will send out a single high-speed coded signal.

Another object of the invention is to provide a beacon which can be fired from an airplane and which will then send out a high-speed coded signal enabling the pilot of the plane to identify the beacon.

Another object of the invention is to provide a system of guiding an airplane in flight using the beacon referred to in the paragraphs above.

Still another object of the invention is to provide a system of guiding an airplane from an automatically fired beacon in which the identity of the beacon will be instantaneously observable in the airplane.

Other objects of the invention and objects relating particularly to the arrangement and interconnection of the various parts will be apparent as the description of the invention proceeds.

One embodiment of the invention has been illustrated in the accompanying drawings in which.

Figure 1:
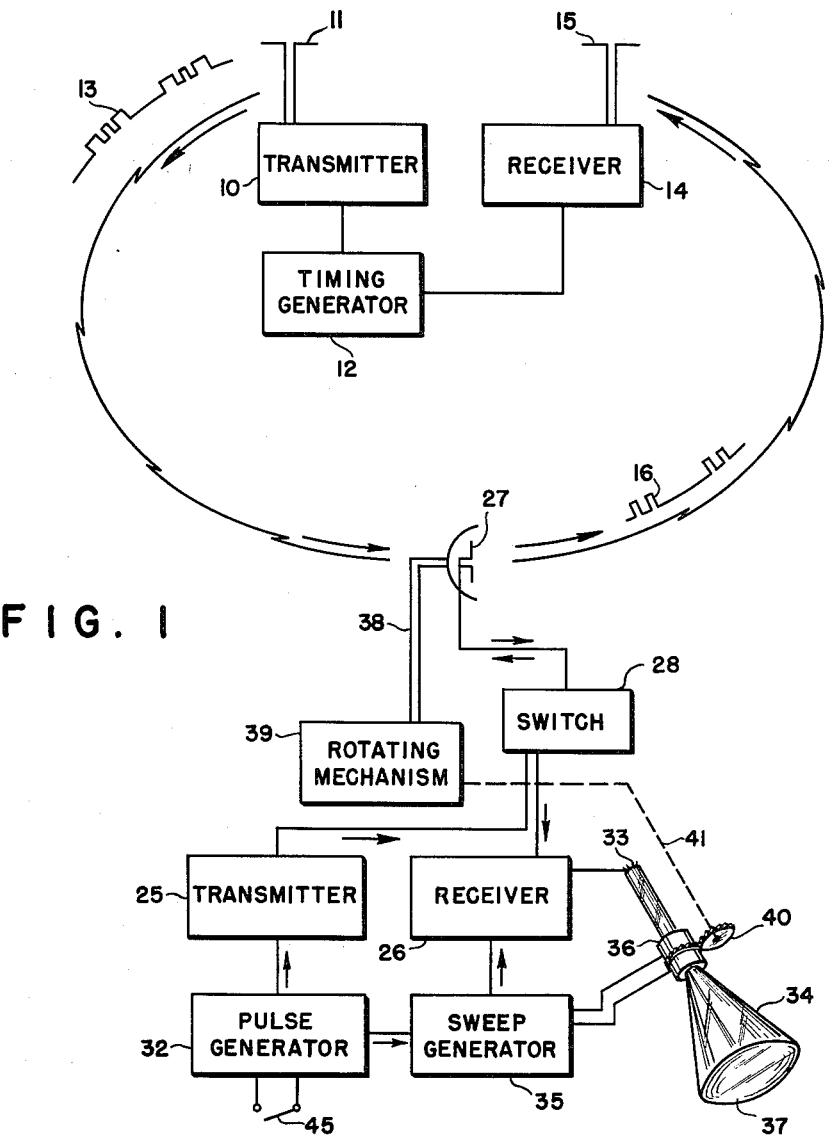
Fig. 1 is a diagrammatic representation of a complete system, showing the beacon and the airplane apparatus which fires it, together with the means for indicating the identity of the beacon at the airplane.

Referring now to Fig. 1, the beacon, which may preferably be located at a landing field or on an aircraft carrier, is shown as comprising a transmitter 10 which is provided with a suitable antenna 11 for radiating electromagnetic oscillations which may preferably be in the microwave region. A timing generator 12 is connected to the transmitter and is arranged to modulate the oscillations produced thereby in a predetermined manner, so that a coded signal may be radiated from the antenna. For purposes of illustration, the signal modulated upon the carrier waves has been indicated at 13 as two long pulses with a short pulse in between them, representing the letter K in the International Morse Code, and these pulses are fast enough so that the total time of the coded signal will be in the order of a hundred microseconds. A circuit for producing this and other code letter combinations will be subsequently described.

A receiver 14 is connected to the timing generator 12 and this receiver is also supplied with an antenna 15 by means of which it may pick up signals broadcast from some remote point.

The receiver is arranged so that it will respond only to signals of a predetermined character, as for instance, a double pulse modulation, as indicated at 16, the carrier frequency being the frequency to which the receiver 14 is tuned. The response of the receiver is used to control the transmitter 10, so that the transmitter 10 is only operating immediately after one of the double pulses 16 has been received by the receiver, and then in a manner and for a period of time sufficient only to radiate the coded signal 13, after which the transmitter is shut off. Therefore, when a double pulse at the proper carrier wave frequency is picked up by the receiver 14, it fires the transmitter 10, radiating a single coded signal, as determined by the timing generator 12.

The apparatus in the airplane for firing the beacon and also for picking up the coded signal and translating the code into a visual indication, so that the beacon may be identified and located, also comprises a transmitter 25 and a receiver 26 (Fig. 1). As shown in the drawing, a single antenna 27 provided with a suitable reflecting system to make the antenna directive is used for both the transmitter 25 and the receiver 26. The transmitter 25 may be connected to the antenna 27 through a switching device 28 which also serves to connect the receiver 26 with the antenna 27. The switching device may be of the discharge type which acts to connect the antenna 27 to the transmitter only when the transmitter is operating and to connect the receiver 26 to the antenna 27 at all other times.

The transmitter has connected to it a pulse generator 32 (Fig. 1) which continuously produces the double pulses 16, already referred to, at, for example, the rate of 2,000 of the double pulses per second. The arrangement is such that a high-frequency electromagnetic wave is radiated from the antenna 27 only during the period of the double pulse 16 and the transmitter is shut off during the interval between successive double pulses. But the receiver is connected to the antenna at this time and hence is free to receive signals picked up by the antenna when the transmitter is not operating. The output of the receiver is connected to the control grid terminal 33 of a cathode ray tube 34 which is used as the indicator.

The cathode ray tube 34 may be of a standard type, and the electron beam thereof may be controlled by electromagnetic or electrostatic deflection. Electromagnetic deflection is illustrated in the drawing. The usual circuits for providing the necessary voltages for the various other electrodes of the tube are of course provided but have been omitted in the drawing.

A sweep circuit generator 35 is provided for the tube 34 and is connected to suitable magnetic coils arranged in a sleeve positioned upon the neck of the tube 34, the current applied to the coils being in the form of a saw-tooth wave arranged to move the electron beam along one of the diameters of the face of the tube. The sweep generator is also controlled by the pulse generator, so that the saw-tooth wave produced by the sweep generator will start to rise as the second pulse produced by the pulse generator terminates. Thus the electron beam starts to sweep across the tube when the transmitter shuts off after radiating the double pulse signal. The sweep current, however, is biased in such a manner that the electron beam will move only from the center of the face 37 of the tube out toward the periphery thereof, and the sweep generator is also connected to the receiver, so as to swing the control grid of the cathode ray tube negative when the electron beam has reached the periphery of the tube to render invisible the return of the beam.

The antenna 27 and associated reflecting system may be positioned so that a relatively narrow beam is directed at a desired angle of elevation. In this position the antenna 27 and associated reflecting system may be rotated about a vertical axis, indicated at 38, by means of a suitable mechanism 39 provided for that purpose. By means of this rotating mechanism the antenna 27 may be rotated through 360°, if desired, or the mechanism may be designed to oscillate the antenna back and forth through any desired horizontal angle.

The sleeve 36 containing the magnetic deflection coil is rotatably mounted upon the neck of the tube 34, and in the modification shown, is mechanically connected by means of a gear wheel 40 which meshes with teeth on the sleeve 36 and by other mechanical connections, illustrated by the dotted line 41, to the mechanism 39 for rotating the antenna 27. Suitable slip rings may be used to make the electrical connections to permit the rotation of the sleeve. The arrangement is such that the sleeve 36 will rotate through 360°, the speed of rotation being proportional to the rotation of the antenna 27, even though the antenna 27 does not rotate through 360°. This results in the path of the electron beam in the cathode ray tube changing its angle as the sleeve 36 is rotated and in proportion to the rotation of the antenna 27.

The operation of the complete system is as follows: The transmitter 25 produces an ultra-high-frequency oscillation which is modulated by the pulse generator 32 to produce the double pulse signal 16. A double pulse is then radiated from the antenna 27 as it rotates on its vertical axis. The switching mechanism 28 then substantially disconnects the transmitter from the antenna and connects the antenna to the receiver until the next double pulse is produced by the pulse generator which will then operate the transmitter to radiate another double pulse signal. Successive double pulse signals are thus radiated from the antenna 27 at a rate which will be adjusted to the desired range of the system.

The antenna 27 continues to rotate until the radiated beam therefrom points in the direction of the beacon and the energy of the concentrated beam reaches the antenna 15 of the beacon receiver 14. Since the receiver 14 is designed to respond only to the particular double pulse transmitted by the airplane antenna 27, it will immediately energize the transmitter 10 which, under control of its timing generator 12, will cause the beacon antenna 11 to radiate one sequence of the coded signal 13. When the beacon is within the designed range of the airplane apparatus, the signal from the beacon will be intercepted by the antenna 27 on the airplane shortly after the double pulse has been transmitted and during the interval of time when the airplane receiver 26 is connected to the antenna 27. Thus, the airplane receiver 26 will receive the coded signal 13 and the control grid of the cathode ray tube 34 will be swung positively for successive periods of time corresponding to the time periods of the coded signal. The electron beam of the cathode ray tube 34, which has meanwhile been moving from the center of the tube toward the periphery, will be intensified at these periods of time and will produce bright spots on the face of the cathode ray tube during these time intervals. These will appear at 42 as a dash-dot-dash for the particular coded signal represented at 13.

At the instant when the signal is received from the beacon, the antenna 27 will be pointed substantially at the beacon, and, as the magnetic deflection coil sleeve 36 is synchronized with the antenna 27, the dash-dot-dash on the face of the cathode ray tube will appear on a line which has an angle with respect, for instance, to a vertical line through the center of the tube, corresponding to the azimuth angle of the antenna 27, or, in other words, to the direction of the beacon from the airplane. Since the electron beam of the cathode ray tube starts from the center of the tube each time the double pulse of the transmitter is transmitted and moves at a uniform speed towards the periphery, the point on the tube at which the coded signal appears will have a distance from the center of the tube proportional to the distance the beacon is from the airplane. This is true because the time required for the radio signal from the airplane to get to the beacon, plus the time for the signal from the beacon to return to the airplane, is proportional to that distance.

The antenna 27 now continues to rotate, and when it moves away from the direction of the beacon the beacon receiver 14 will no longer pick up the double pulse signal and the beacon will cease radiating its code signal. No signal from that beacon will therefore be received by the receiver 26 in the airplane until the antenna 27 has rotated through its complete cycle and is back again pointing in the direction of the beacon. The double pulse radiated from the airplane antenna 27 will then be received again by the beacon receiver 14, and the beacon transmitter 10 will be fired, thus radiating the coded signal 13. Again the signal 13 is picked up by the airplane antenna 27 and is fed to the receiver 26 the response of which operates the control grid of the cathode ray tube and the dash-dot-dash is again produced on the face of the cathode ray tube in the same position as before (assuming there has been substantially little change in the position of the airplane). However, as the airplane is turned towards the beacon, the coded signal will move around on the tube until it is in a position corresponding to the head-on position, which, for example, may be at the top of the tube on the vertical line through the center.

It will be understood that while the radiated beam from the antenna 27 is sweeping across the beacon receiver antenna 15, several of the signals from the airplane may be intercepted, and hence the beacon will send out several complete coded signals at a time. This group of signals, thus produced, will operate merely to increase the circumferential dimension of the dash-dot-dash indication on the face of the tube.

As the airplane approaches the beacon, the signal will continue to come in, but, because it will take less time for the signal from the beacon to reach the airplane, the visible indication on the tube will move towards the center. The pilot of the plane is thus informed of the direction of the beacon and the distance it is from his plane, and can guide his plane towards the beacon and, where the beacon is situated at a landing field, can locate the field and making a landing.

Although I have shown a means to rotate the electromagnetic deflection sleeve 36 so as to control the direction of the sweep of the beam across the face of the tube, it will be understood that this might be done electrically if desired. Also, the sweep of the electron beam may be controlled by electrostatic deflection.

The transmitter 10 at the beacon may be operated at the same frequency as the transmitter 25 in the airplane, and the double pulse signal 16 will be reflected back from the beacon and will be received at the receiver 26 at about the same time that the signal is received from the beacon transmitter 10. However, the reflected signal will be much weaker than that received from the beacon, since the energy of the reflected signal varies inversely with the fourth power of the distance between the airplane and the beacon, while the energy received from the beacon transmitter varies inversely as the square of this distance. Therefore, there will be no substantial interference between the signals on the face of the tube 31. However, if desired, the beacon transmitter 10 may be arranged to broadcast at a frequency different from that of the transmitter 25, and the airplane receiver 26 may be tuned to the frequency of the transmitter 10. In this case, there will be no possibility of interference between the signal broadcasted from the beacon and the reflected signal which is transmitted from the antenna 27 and reflected from the beacon. A separate antenna system for the receiver 26 may be used in this case.

I may prefer to design the beacon transmitter 10 to broadcast on a wide range of frequencies, so that airplanes equipped with receivers tuned to different frequencies may pick up the beacon signal. Also the beacon receiver might have a broad band so as to receive and respond to double pulse signals on different carrier frequencies.

Where the beacon is being used to guide an airplane, it is important that the time interval between the receipt of a double pulse signal by the receiver 14 and the firing of the transmitter be reduced to a minimum and be held constant. The distance the airplane is from the beacon, or, in other words, its range, is determined by measuring the time required for the double pulse to leave the airplane and the coded signal to be received. Therefore any delay in the time between the receipt of the signal from the airplane and the firing of the beacon will appear as an error in the range determination unless that delay is known and can be taken into account.

Figure 2:
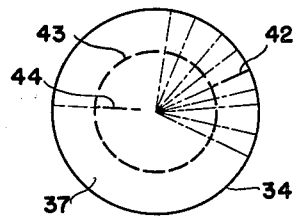
Fig. 2 is a front view of the vacuum tube indicator of Fig. 1, showing the manner in which the indication is received.

It is also desired to get the coded signal from the beacon to the airplane before the next pulse is transmitted from the airplane. The double pulse sent out by the airplane may occupy a time duration of three or four microseconds, leaving about 496 or 497 microseconds between the radiation of the pulses, during which time the receiver is ready to receive the coded signal back from the beacon. This is assuming a repetition rate of 2000 of the double pulses per second. Since the cathode ray beam starts from the center of the tube at the termination of a double pulse and moves out towards the circumference, arriving at the edge before the beginning of another pulse, it will be seen that this time interval determines the range of the apparatus. If we allow 100 microseconds for the time duration of the coded signal, this signal from the beacon would have to be received at the airplane 100 microseconds before the cathode ray beam reaches the edge of the tube in order for the entire code to be reproduced. If we have 496 microseconds available and 100 are needed for code, we would then have a range of the apparatus corresponding to 396 microseconds. This range for the figures given would be roughly about 39 miles. The dot-and-dash line 43 in Fig. 2 indicates the range limit of the system, as far as the coded beacon is concerned, although in actual practice this line would come nearer the circumference of the tube. If the beacon is at the maximum range of the apparatus, then the visibly indicated coded signal will be received, as indicated at 42 between the line 43 and the circumference of the tube. If the beacon is nearer than the maximum range, this signal will appear somewhere nearer to the center of the tube. Even if the beacon is farther than the maximum range, its position may be observed, because the first dash, or a portion of it, may appear at the rim of the tube, although the identification may not be complete.

In operating the system of the invention a number of beacons may be provided, each with a different code, so that they can be identified from various remote points. Thus, if another beacon having a code signal dot-dash-dot were located at another direction from the airplane and nearer to it, the coded signal might appear as indicated at 44 on Fig. 2. The presence of the other beacon indication on the cathode ray tubes gives that much more information to the pilot so that he can determine his course very easily and accurately. Nevertheless, the observation of only one beacon gives the pilot both direction and distance; no triangulation is necessary.

Because of the persistence of vision, the operator will be able to see the coded traces as if all the components were simultaneously made. However, the image may be made to last even longer, if desired, by using a tube having a screen made of material which will retain the image for a longer period of time.

It will be understood that the cathode ray tube is especially useful as an indicator for the system of the invention because of the very small time intervals involved. The time the cathode ray beam has to travel from the center of the tube to the periphery is measured in microseconds and this rate of deflection may be easily attained in a cathode ray tube.

A system of radio echo detection has been used in airplanes. With such a system a succession of discrete pulses may be radiated from the plane while the directional antenna is scanning a field in space. If the radiated waves strike an object within the scanned field, they will be reflected back from the object and received by the airplane. The position of the antenna when the reflected signal is received will then give the direction of the object, and the time required for the pulse to reach the airplane after being reflected from the object will represent the distance the object is from the airplane. Such radio echo detection apparatus, if installed on an airplane, utilizes the same apparatus as described in connection with the airplane equipment of this invention, with the exception that it is not necessary to send out a double pulse from the antenna 27. It therefore becomes a practical matter to use the radio echo detection equipment in the airplane to send out the pulses necessary to fire the radio beacon and also to receive the signals from the beacon and indicate the range and direction. If desired, the pulse generator 32 may be provided with a switch 45 and suitable circuit connections so that the pulse generator may be caused to produce the double pulse when the switch is thrown one way and the single pulse for the radio echo detection when the switch is thrown the other way. Of course when the single pulse is transmitted, the beacons will not respond. The same switch may retune the receiver 26 to the frequency of the transmitter 10, if that frequency is not the same as that of the transmitter 25.

The time duration of the coded signal radiated by the beacon is preferably made as short as possible, since the sweep of the electron beam in the indicator tube must include the time interval of the code in addition to the time interval required for the airplane signal to travel to the beacon and the coded signal to travel from the beacon to the airplane. I prefer to produce the code within an interval of 100 microseconds, although, of course, this interval may be increased, if desired, depending on the particular application. Probably, it would never need to exceed one millisecond.

Various circuits may be used for producing a coded signal within this time interval. I may prefer, however, to use the circuit shown in Figs. 3, 4, and 5. Each of these figures shows a part of the circuit, the connections between the parts being indicated by letters. The circuit comprises several distinct portions, each having a different function. Tubes 46, 47 and 48 are arranged to produce a substantially square negative pulse, indicated at 49. The tube 46 may be a pentode tube arranged as an amplifier to receive on its grid a positive pulse, indicated at 50, from the receiver 14, and to feed a negative pulse to the grid circuit of the tube 47. The tubes 47 and 48 are connected to form a modified multivibrator circuit which does not oscillate but has a cumulative effect to produce maximum conductivity in the tube 48 whenever the tube 47 is cut off by a negative pulse on its grid. The tube 48 will then remain conducting, as will be understood, for a period of time depending on the time constant of the circuit, so that the negative square pulse 49, produced in the plate circuit of the tube 48, will have a predetermined time duration, in this instance, corresponding in time to the desired time duration of the coded signal 13 of Fig. 1.

The negative square wave pulse 49 is then fed to the grid of a tube 51, which, together with tubes 52 and 53, forms a saw-tooth wave generator. The tube 51 may be a simple triode, and is connected in series with the tube 52, which is shown as a pentode tube arranged to operate at constant plate current, regardless of the plate voltage. Since the tubes 51 and 52 are in series, no voltage will be delivered to the plate of the tube 52 except when the tube 51 is conducting. A condenser 54 is connected between the plate of the tube 52 and the ground, and the plate of the tube 52, is also connected through a coupling condenser 55 and inductance 56 to the grid of the tube 53, this grid being biased in the usual manner by a resistance 57.

The tube 51 is normally conducting, and since the resistance of the tube 52 is relatively high and the condenser 54 is in parallel with it, the condenser 54 will be charged to its fullest capacity and will remain charged as long as the tube 51 is conducting. During this time the tube 53 is also conducting, since the grid of that tube is at cathode potential.

Now, when the negative square pulse 49 is applied to the grid of the tube 51, this grid is driven below cut-off and removes the voltage source from the plate of the tube 52. The condenser 54, being fully charged, begins to discharge through the constant current tube 52, and as the voltage of the condenser decreases, the voltage on the grid of the tube 53 will also decrease, thus causing an increase of voltage on the plate of that tube. The constant decrease of grid voltage on the tube 53 produces in effect a negative saw-tooth wave, as indicated at 58, while the increase in voltage on the plate of the tube 53 produces the positive saw-tooth wave, indicated at 59.

Figure 3:
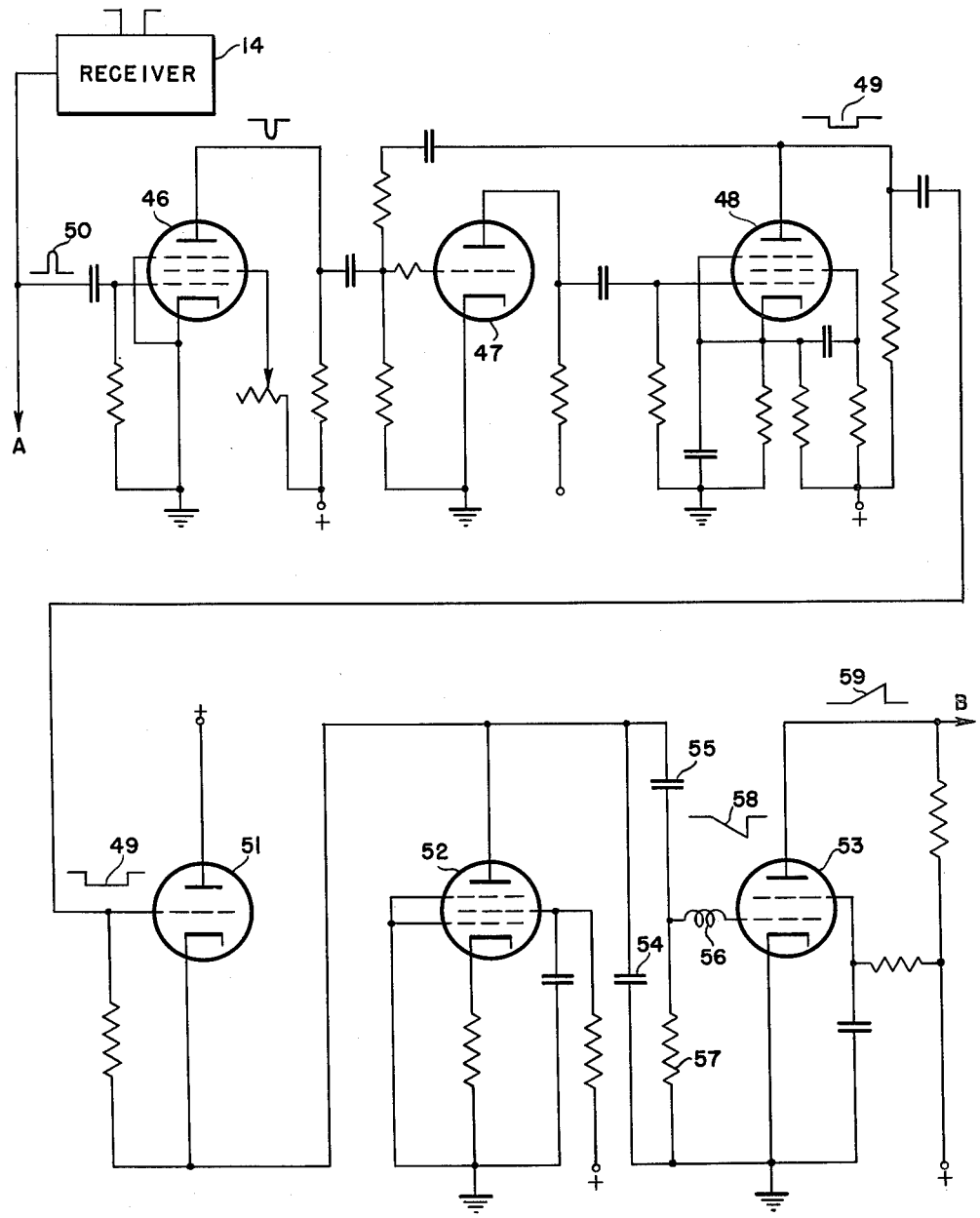
Figs. 3, 4 and 5 are cooperating portions of a circuit for producing the coded signal which is radiated by the beacon.
Figure 4:
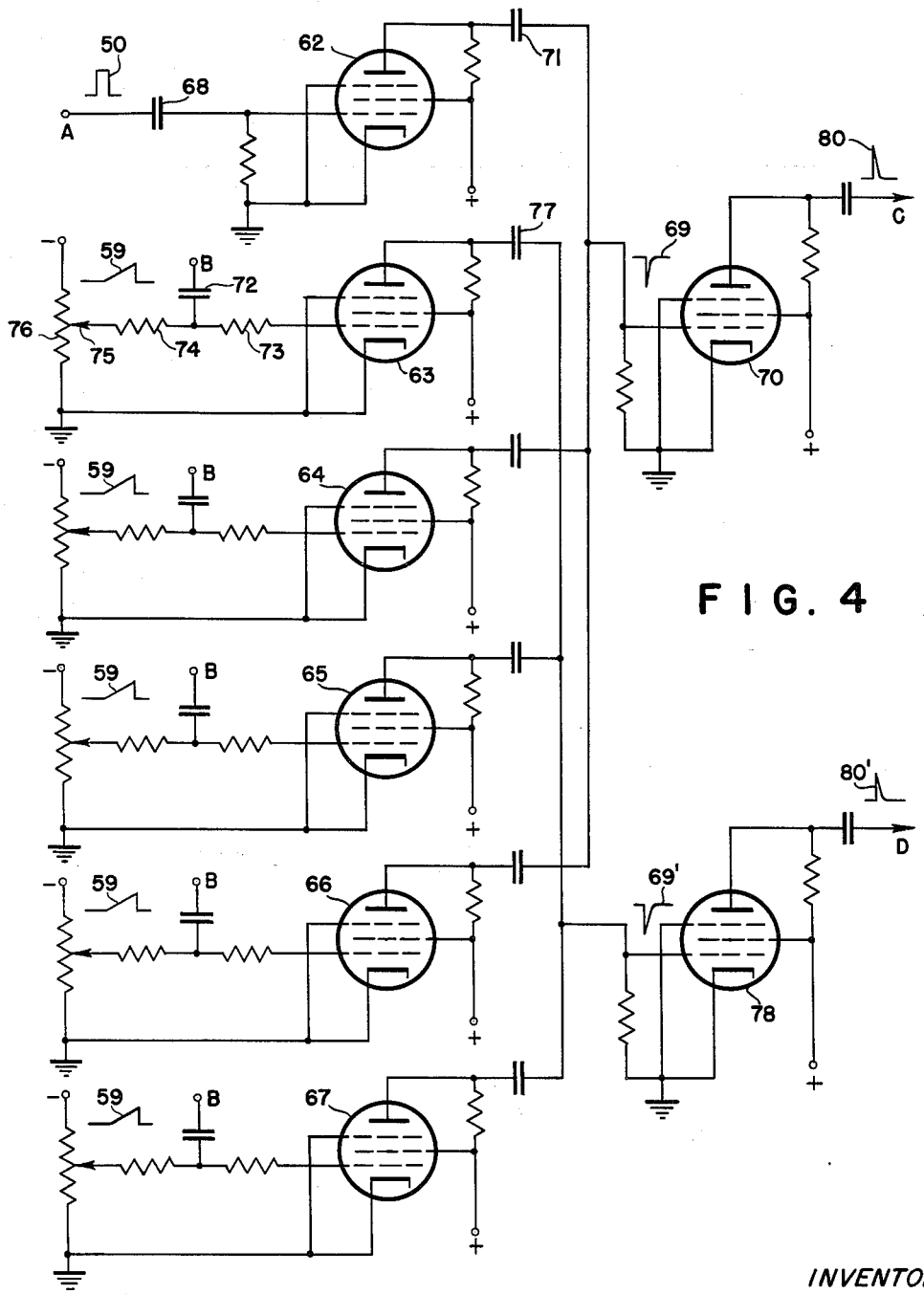

In Fig. 4 is shown a circuit for producing the successive sharp pulses, each separated from the other by a predetermined time duration, for starting and stopping the pulses which form the component parts of the coded signal 13. In this circuit a group of pentode tubes 62, 63, 64, 65, 66, and 67, are shown, these tubes all being biased below cut-off, but in different amounts, as will be explained. The grid of the tube 62 is connected through the condenser 68 to the receiver 14 shown in Fig. 3. This is indicated by the letter A appearing on the diagram of Fig. 4 and also on that of Fig. 3. The grid of the tube 62, therefore, receives the positive pulse 50 from the receiver 14. This drives the tube above cut-off immediately, causing the tube to conduct and producing a sharp negative pulse, indicated at 69, on the grid of the tube 70, this grid being connected to the plate of the tube 62 through the small condenser 71.

The grid circuits of the tubes 63, 64, 65, 66 and 67 are similar. Each receives the positive saw-tooth wave 59 from the point marked B on Fig. 3, which is the output of the tube 53. This point is connected to the point marked B in the grid circuit of each of the tubes 63 to 67 inclusive in Fig. 4. Between this point and the grid of each tube is a condenser 72 and a resistor 73. Also in each grid circuit a resistor 74 is connected between the juncture of the resistor 73 and the condenser 72 and the movable arm 75 of the potentiometer 76. One end of the winding of this potentiometer is connected to ground and the other end to a source of negative potential. Adjustment of the arm 75 on the potentiometer will vary the grid bias on the associated tube, so that the grid bias of the tubes 63 to 67 inclusive may be adjusted to any desired cut-off value.

When the positive saw-tooth potential 59 is impressed on the grids of the tubes 63 to 67 inclusive, the grid potential of each tube will rise along the saw-tooth wave until the cut-off point has been reached, at which time the tube will become conductive and the plate voltage of the tube will drop to form a negative pulse, similar to the pulse 69, which is then transferred through a condenser 77 to the tube 70 or to a similar tube 78, depending on the particular connections. As has already been stated, the tube 62 is connected to the grid circuit of the tube 70, so are also the tubes 64 and 66. The plate circuits of the tubes 63, 65, and 67 are connected to the grid circuit of the tube 78 and deliver pulses 69' to that circuit.

The tube 62 produces its pulse 69 as soon as it receives the pulse 50 from the receiver 14. The grid bias of the tube 63 is adjusted, however, so that it will not become conductive until a period of time has elapsed corresponding to the time interval of the first component, the dash, in the coded signal 13. The bias of the tube 64 is adjusted so that this tube will not become conductive until an additional period of time has elapsed corresponding to the time interval between the end of the first component of the coded signal 13, the dash, and the beginning of the second component, the dot. The bias of the tube 65 is then adjusted so that this tube will not become conductive until an additional period of time has elapsed corresponding to the time duration of the dot in the coded signal 13. In like manner the grid of the tube 66 is biased so that this tube will not become conductive until an additional time has elapsed corresponding to the space between the dot and the second dash in the coded signal 13. And similarly, the grid bias of the tube 67 is adjusted so that that tube will not become conductive until an additional time has elapsed corresponding to the time duration of the last dash of the signal 13.

In this manner the tubes 62 to 67 inclusive start to conduct in sequence after the receiver 14 transmits its pulse 50, the starting of each tube corresponding to the beginning or end of one of the coded signal components. Since the tubes 62, 64 and 66 are connected to the tube 70, this tube will produce a positive pulse 80, corresponding to the beginnings of the component parts of the coded signal, while, since the tubes 63, 65 and 67 are connected to the tube 78, this tube will produce a positive pulse 80', corresponding to the ends of the component parts of the coded signal.

Figure 5:
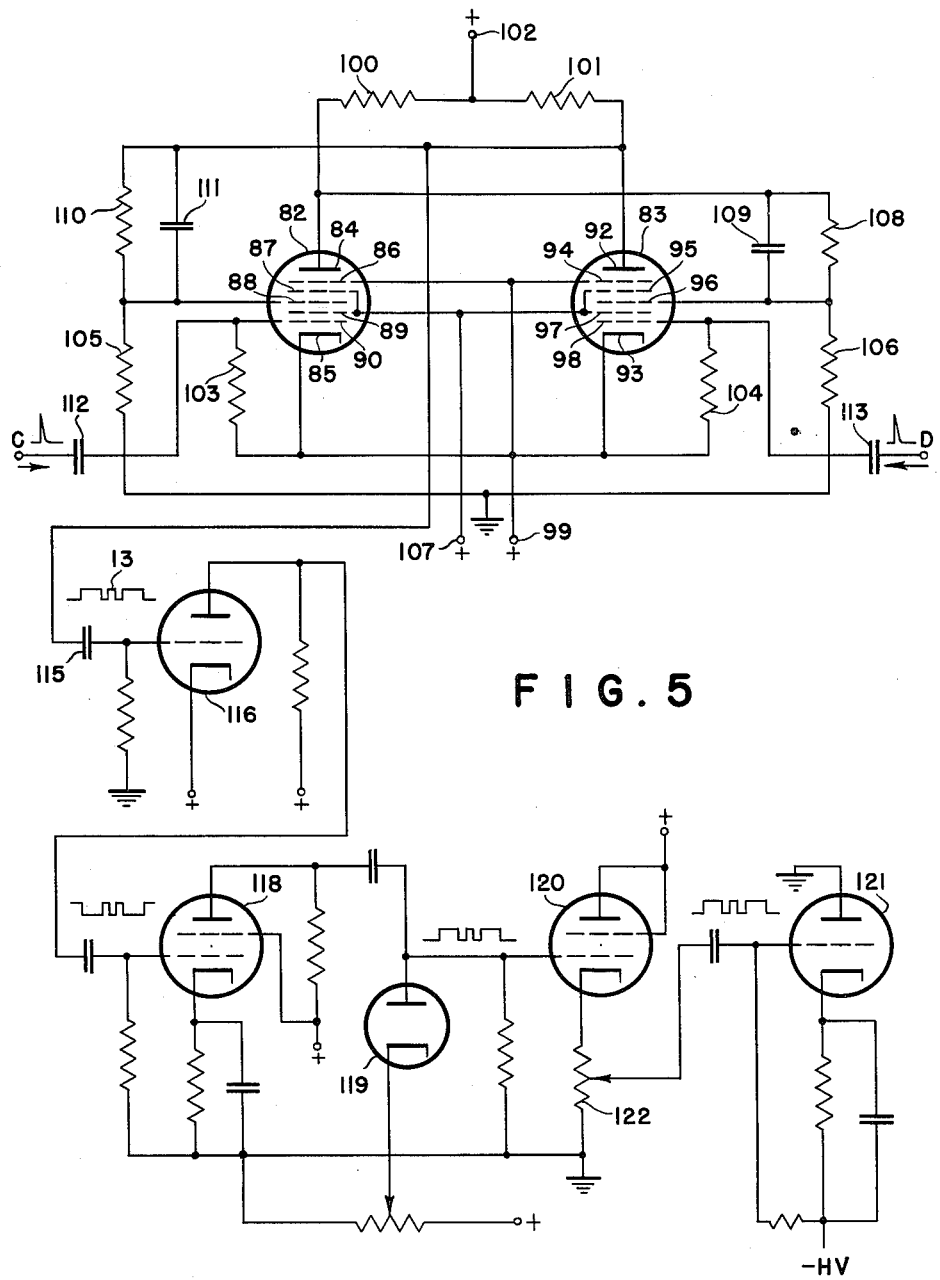

The circuit for transforming this succession of pulses 80 and 80', corresponding to the beginnings and the ends of the component parts of the coded signal 13, is shown in Fig. 5. In this circuit two multi-electrode tubes 82 and 83 are connected together to form a flip-flop circuit having two conditions of operation: either one tube is completely off and the other tube is full on, or the second tube is completely off and the first tube is full on. Besides the plate 84 and the cathode 85 of the tube 82, there are shown five separate grids, 86, 87, 88, 89 and 90. The grids 90 and 88 are control grids which are completely shielded from each other and from the other elements by means of the screen grids 87 and 89. The grid 86, next to the anode, is a suppressor grid. Similarly, the tube 83, in addition to its anode 92 and cathode 93, has five grids 94, 95, 96, 97 and 98. Of these the grids 96 and 98 are control grids which are shielded by the screen grids 95 and 97, the grid 94 being the suppressor grid.

The cathodes 85 and 93 and suppressor grids 86 and 94 of the two tubes 82 and 83 are connected together and to a source of positive potential, indicated at 99. The plates 84 and 92 of the two tubes are connected respectively through resistors 100 and 101 to a source of still greater positive potential indicated at 102. The first control grids 90 and 98 are connected respectively through biasing resistors 103 and 104 to the cathodes 85 and 93. The second control grids 88 and 96 respectively of the tubes 82 and 93 are connected through resistors 105 and 106 respectively to the ground. All of the screen grids, 87, 89, 95, and 97 are connected to a source of positive potential indicated at 107. The plate 84 of the tube 82 is directly connected through a resistor 108 to the second control grid 96 of the tube 83, the resistor 108 being shunted by a condenser 109. Similarly, the plate 92 of the tube 83 is connected through a resistor 110 to the second control grid 88 of the tube 82, the resistor 110 being shunted by a condenser 111.

The control grid 90 of the tube 82 is supplied with the output of the tube 70 of Fig. 4 through a suitable coupling condenser 112, the connection between the output circuit of Fig. 4 and the grid circuit of the tube 82 being indicated by the letter C on both figures. Similarly, the output of the tube 78 of Fig. 4 is connected to the control grid 98 of the tube 83 of Fig. 5 through a suitable coupling condenser 113, this connection being indicated by the letter D in both Figs. 4 and 5.

In the operation of the flip-flop circuit of Fig. 5, assume a positive pulse is applied to the control grid 90 of the tube 82. This increases the current flowing in the tube 82 with the result that the potential on the plate 84 drops. The lowered potential on the plate causes the second control grid 96 of the tube 83 to be correspondingly lowered in potential with the result that the current in the tube 83 is reduced. Reduction of the current in the tube 83 causes the plate 92 of this tube to increase in potential, and since this plate is connected to the control grid 88 of the tube 82, this grid swings positively a corresponding amount, causing the tube 82 still further to increase in conductivity. The effect is thus cumulative, a positive potential applied to the control grid 90 of the tube 83 causing the tube 82 immediately to reach its maximum conductivity while the tube 83 is shut off. This condition will maintain until something happens to change it.

If now a positive potential is applied to the control grid 98 of the tube 83, this tube starts to conduct. An increased current in the tube 83 will cause the plate 93 thereof to drop in potential, which causes the control grid 88 of the tube 82 to swing negative a corresponding amount, with the result that the current flow in the tube 82 is decreased. This decrease of current through the tube 82 will cause its plate 84 to increase in potential, with the result that the control grid 96 connected to it will correspondingly increase thus increasing the current through the tube 83. Thus the tube 83 will immediately become conductive and the tube 82 will be shut off.

The output of this flip-flop circuit is taken from the plate 92 of the tube 83 and is delivered through a suitable coupling condenser 115 to the grid of a triode tube 116. It will be seen that as the pulses from the circuit of Fig. 4 are alternately and successively applied to the grids of the tubes 82 and 83, the circuit will flip-flop back and forth and positive pulses will appear on the grid of the tube 116 which are substantially square and correspond in duration to the timing of the pulses produced by the circuit of Fig. 4. As shown, the signal thus applied to the grid of the tube 116 will be the coded signal 13, already described.

The tube 116, together with the additional tubes, 118, 119, 120, and 121, may be included in the transmitter 10. The triode amplifier tube 116 feeds an inverted coded signal into the grid cicuit of the tube 118 from which a positive coded signal is applied to the control grid of the cathode follower tube 120, in the cathode circuit of which is placed the resistor 122. The potential drop across a portion of this resistor 122 is applied between the anode and control grid of the tube 121 which may be an oscillator of the velocity modulation type or other type of oscillator capable of producing high-power oscillation. Because of the cathode follower tube 120, a positive coded signal appears on the grid of the oscillator tube and causes this tube to operate during the positive portions of the coded signal. The diode 119 is connected between the grid of the tube 120 and ground and is biased so as to clip off any unwanted portions of the pulses which may be found above the flat tops thereof.

The circuits of Figs. 3, 4 and 5 are subject to considerable variation. For instance, in the saw-tooth generator comprising tubes 51, 52 and 53 of Fig. 3, the constant current tube 52 is used where it is desired to produce a linear saw-tooth wave. However, because the grids of the tubes 63 to 67 in Fig. 4 may have biased potential, adjusted as desired, it is not necessary to produce a linear saw-tooth. Therefore, the tube 52 may be omitted entirely and a resistance substituted in place of it, shunted across the condenser 54.

In Fig. 4 the tubes 62 to 67 are pentode vacuum tubes, but gas-filled tubes might be used, if desired. Such tubes are under the control of their grids only when the tubes are not conducting, and, when once started conducting by positive pulses applied to the grids, will continue to conduct as long as they have sufficient plate potential to maintain the conduction through the gas. With such tubes additional means to shut off the plate voltage after the coded signal is produced would have to be provided.

From the above explanation it will already be clear that when a pulse is delivered by the output of the receiver, the tubes 46, 47 and 48 cooperate to produce a negative square pulse which is then applied to the saw-tooth generator including the tubes 51, 52 and 53. These tubes cooperate to transform the negative square pulse into a positive saw-tooth which is then impressed on the grid circuits of tubes 63 to 67, inclusive, the pulse from the receiver being impressed on the grid circuit of the tube 62. The arrangement of grid biases of these tubes causes them to operate successively and the successive operation of the tubes causes sharp pulses to be applied alternately to the control grid circuits of the tubes 82 and 83 in Fig. 5. This produces the flip-flop action causing the succession of positive pulses 13 to appear in the output of this flip-flop circuit, the duration of these pulses depending upon the timing of the tubes in the circuit of Fig. 4. This coded signal is again amplified by the tubes 118 and 120 and impressed upon the control grid of the transmitting oscillator, so that the oscillations radiated by the antenna 11 are modulated in accordance with the coded signal. As soon as the transmitter has radiated the single code combination, nothing more happens until another pulse appears in the output circuit of the receiver 14. Thus the transmitter will send out its single coded signal only when the receiver responds.

It will be understood from a consideration of Figs. 4 and 5 that by adjusting the grid biases of the tubes 62 to 67 various combinations of a coded signal involving three components may be produced, instead of the dash-dot-dash signal given by way of example. It will also be evident that by omitting two of these tubes, combinations of two components in the signal may be produced, while by adding additional pairs of tubes, the circuit will operate to form additional components in the coded signal.

Many modifications of the invention may be made without departing from the spirit thereof and I do not desire therefore to limit myself to what has been shown and described except as such limitations occur in the appended claims.

What I desire to claim and secure by Letters Patent is:

1. A circuit for producing a plurality of pulses each having a predetermined time duration separated at predetermined time intervals comprising, in combination, a plurality of thermionic tubes, means to bias the grid circuits of said tubes so that said tubes will operate at predetermined different grid voltages, means to produce a saw-tooth voltage wave, means to apply said saw-tooth voltage wave to the grid circuits of said tubes so that said tubes will operate in a predetermined sequence of operation, a flip-flop circuit having two conditions of operation, means to connect alternate tubes in the sequence of operation to said flip-flop circuit in such a manner as to cause the operation of said tubes to produce one condition of operation of said flip-flop circuit, and means to connect the remaining tubes to said flip-flop circuit so as to produce the other condition of operation of said circuit when said tubes are operated.

2. A circuit for producing a plurality of pulses each with a predetermined time duration and having predetermined time intervals between said pulses comprising, in combination, means to produce a saw-tooth voltage wave, a plurality of thermionic tubes, a flip-flop circuit capable of two conditions of operation, means to cause one of said thermionic tubes to operate at an early point in the formation of said saw-tooth wave, means to cause the operation of that tube to produce one condition of operation in said flip-flop circuit, means to cause a second thermionic tube to operate after a predetermined time interval of said saw-tooth wave, means to cause the operation of said second thermionic tube to produce the other condition of operation of said flip-flop circuit, means to cause a third thermionic tube to operate after a predetermined time interval of said saw-tooth wave, means to cause the operation of said third thermionic tube to produce again the first condition of operation of said flip-flop circuit, means to cause a fourth thermionic tube to operate after a predetermined time interval of said saw-tooth wave, and means to cause the operation of said fourth thermionic tube to produce again said second condition of operation of said flip-flop circuit.

3. A radio transmitter adapted to produce pulses of oscillations, each pulse having a predetermined time duration and with predetermined time intervals between pulses comprising, in combination, an oscillating circuit for producing carrier frequency oscillations, a flip-flop circuit capable of having a first and a second condition of operation, means to cause said first condition of operation of said flip-flop circuit to energize said oscillating circuit, means to cause said second condition of operation of said flip-flop circuit to de-energize said oscillating circuit, a first thermionic tube, means to operate said thermionic tube, means to cause the operation of said thermionic tube to produce said first condition of operation of said flip-flop circuit, a second thermionic tube, means to operate said second thermionic tube a predetermined time interval after said first thermionic tube has operated, means to cause the operation of said second thermionic tube to produce said second condition of operation of said flip-flop circuit, a third thermionic tube, means to operate said third thermionic tube a predetermined time interval after the operation of said second thermionic tube, means to cause the operation of said third thermionic tube to produce said first condition of operation of said flip-flop circuit, a fourth thermionic tube, means to operate said fourth thermionic tube a predetermined time interval after the operation of said third thermionic tube, and means to cause the operation of said fourth thermionic tube to produce said second condition of operation of said flip-flop circuit.

4. A circuit for producing a coded signal in response to a signal pulse comprising, in combination, means responsive to said signal pulse for producing a saw-tooth voltage wave, a plurality of thermionic tubes, means for biasing the grid circuits of said tubes to cause said tubes to operate at different grid voltages, means for applying said saw-tooth voltage wave to the grid circuits of said tubes to cause said tubes to operate in a predetermined time sequence, a flip-flop circuit having two conditions of operation, means connecting alternate tubes in the sequence of operation to said flip-flop circuit and arranged to produce one condition of operation of said flip-flop circuit, and means connecting the remaining tubes to said flip-flop circuit and arranged to produce the other condition of operation of said flip-flop circuit.

5. A system for producing a pulse train comprising, in combination, first, second and third thermionic tubes, means for biasing said tubes beyond cutoff with the negative bias on successive tubes being of increasingly greater magnitudes, means for applying a saw-tooth voltage wave input signal to the control grids of said tubes whereby said tubes are sequentially rendered conductive, a bi-stable multivibrator having first and second control grids, means for applying the output of said first and third tubes to said first control grid whereby a first condition of operation is established at said multivibrator in response to the conduction of said first or third tube and whereby the beginning of an output pulse in the coded pulse train is determined, and means for applying the output of said second tube to said second control grid whereby a second condition of operation is established at said multivibrator in response to the conduction of said second tube and whereby the end of an output pulse in the coded pulse train is determined.

6. A system for producing a train of coded pulses comprising, a series of thermionic tubes, means for biasing said tubes beyond cutoff with the negative bias on successive tubes being of increasingly greater magnitudes, means for applying a positive saw-tooth wave to the control grids of said tubes whereby said tubes are sequentially rendered conductive, a bi-stable multivibrator having first and second control grids, means for connecting the odd numbered tubes in said series to the first control grid of said multivibrator whereby a first condition of equilibrium is established at said multivibrator in response to the conduction of an odd numbered tube and whereby the beginning of a predetermined pulse in the coded pulse train is determined, and means for connecting the even numbered tubes in said series to the second control grid of said multivibrator whereby a second condition of equilibrium is established at said multivibrator in response to the conduction of an even numbered tube and whereby the end of a predetermined pulse in the pulse train is determined.

7. In a system for generating a coded pulse train made up of unequal length pulses having unequal pulse spacings, the combination of a series of thermionic tubes, means for applying increasingly higher blocking potentials to the control grids of successive tubes in said series whereby said tubes are normally maintained nonconductive, means for applying a positive saw-tooth wave to the control grids of said tubes whereby said tubes are sequentially unblocked, a bi-stable multivibrator having first and second control grids, means for applying the output of the odd numbered tubes in said series to said first control grid for initiating a coded output pulse and means for applying the output of the even numbered tubes in said series to said second control grid for terminating an output pulse, the difference in blocking potential on the control grid of an odd and the next higher even tube in said series being so selected with respect to the slope of said saw-tooth wave that the time interval between conductivity of these tubes corresponds to the length of duration of said pulses in said pulse train and that the time interval between conductivity of an even and the next higher odd tube in said series corresponds to the length of duration of said pulse spacings in said pulse train.

References Cited in the file of this patent

UNITED STATES PATENTS

| 1,979,484 | Mathes | Nov. 6, 1934 |
| 2,312,357 | Odquist et al. | Mar. 2, 1943 |
| 2,331,418 | Nolde | Oct. 12, 1943 |
| 2,421,018 | De Rosa | May 27, 1947 |
| 2,522,551 | Williams | Sept. 19, 1950 |
| 2,606,287 | McCoy | Aug. 5, 1952 |

OTHER REFERENCES

Loeffel: "A Circuit for Firing Thyratrons in Timed Sequence," Review of Scientific Instruments, vol. 12, February 1941, pages 102 and 103.